United States Patent [19]
Kinkelaar

[11] Patent Number: 5,415,895
[45] Date of Patent: May 16, 1995

[54] METHOD FOR PRODUCING IMPROVED COATING COMPOSITION WITH CORROSION RESISTANCE

[75] Inventor: Edmund W. Kinkelaar, Dublin, Ohio

[73] Assignee: Texo Corporation, Cincinnati, Ohio

[21] Appl. No.: 81,228

[22] Filed: Jun. 25, 1993

[51] Int. Cl.⁶ .............................................. B05D 3/02
[52] U.S. Cl. ................ 427/388.4; 427/388.5; 524/301; 524/313; 524/481
[58] Field of Search ............... 427/388.1, 388.4, 388.5; 524/310, 313, 481

[56] References Cited

U.S. PATENT DOCUMENTS

| | | | |
|---|---|---|---|
| 4,256,591 | 3/1981 | Yamamoto et al. | 252/493 X |
| 4,737,385 | 4/1988 | Pekar et al. | 427/385.5 |
| 4,849,264 | 7/1989 | Pekar et al. | 427/388.1 |
| 5,037,678 | 8/1991 | Kinkelaar | 427/388.1 |
| 5,248,525 | 9/1993 | Siebert | 427/337 |

*Primary Examiner*—Michael Lusignan
*Attorney, Agent, or Firm*—Biebel & French

[57] ABSTRACT

A process for manufacturing a dry-to-touch coating having corrosion resistance and torque is provided. The process comprises the steps of adding PTFE to an oil, with the oil containing a amine soap, thoroughly mixing the PTFE into the oil, forming a homogenous dispersion of the PTFE in the oil, mixing a resin forming paint component, adding water to the mixed paint component, mixing the resin forming paint component and water with the oil, and adjusting the pH. The resin forming paint component comprises in the range of 40% to 70% of the coating, the water comprises in the range of 5% to 10% of the coating, and the oil and PTFE blend comprises in the range of 10% to 30% of the coating. Additionally, the PTFE when added to the oil preferably comprises in the range of 10% to 30% by weight. The process further involves the exposure of the resin, water, and oil mixture to a temperature of between 175° to 250° F. until it is dry-to-touch.

12 Claims, No Drawings

METHOD FOR PRODUCING IMPROVED COATING COMPOSITION WITH CORROSION RESISTANCE

FIELD OF THE INVENTION

The present invention relates generally to a method for producing a coating composition, and more particularly to such a coating composition which has corrosion resistance.

BACKGROUND OF THE INVENTION

Many prior attempts have been made to improve the salt spray protection on metal parts and include various protective coatings, or combinations of more than a single coating, on a metal part. U.S. Pat. No. 4,165,242 discloses a general description of prior art processes for treating phosphated metal parts to improve corrosion resistance utilizing the general steps of applying a paint coat, and then an oil coat in separate steps. This patent includes descriptions of some of the paint and oil formulations well known to those skilled in the art to be useful in such processes.

Initial attempts to use an oil coupled into the paint vehicle resulted in limited corrosion resistance which was not acceptable to industry standards. Under this prior art process, the metal parts were treated in a batch method. A first coat of paint was applied to the parts by dip spinning them. The parts were then baked, after which any parts adhered to one another had to be physically separated. However, this separation often resulted in the paint coat being pulled away from one of the parts at the point of engagement of adjacent parts resulting in exposing an unpainted surface area.

To combat this problem a second painting step was employed. Of course, there still existed the possibility that a limited amount of surface area would still remain exposed. After the second painting step, the entire batch was coated with an oil emulsion to reduce the affect of corrosion. This process involved high paint VOC values, substantial labor, and a significant investment in time, all of which resulted in parts which still had a tendency to corrode due to uncoated surface area.

In an attempt to solve that problem, a waterborne system was invented having a lower VOC value, and which system was more effective. U.S. Pat. No. 4,737,385 discloses a composition and method whereby a single application to a part of a coating comprising an oil phase and a resin film forming paint advantageously results in providing both a paint film layer and a distinct oil layer overlying the paint film. Significantly improved corrosion resistance is disclosed therein, along with the economical advantage of eliminating the plural separate coating steps heretofore conventionally employed.

However, for some machine parts, such as threaded torque fasteners, it is desirable to provide a reduction of the coefficient of friction, such that the desired tension of the fastener can be achieved with reduced torque requirements. For years, cadmium electroplate and wax coatings were considered the standard for achieving low levels of friction for lubricated torque fasteners. However, cadmium became classified as a hazardous waste material due to its high toxicity. Therefore, it became desirable to replace the cadmium electroplate and wax coating on parts, yet still retain corrosion resistance and low coefficients of friction.

U.S. Pat. No. 4,849,264 discloses such a coating composition. However, while excellent corrosion resistance is provided to metal parts along with the parts being able to torque, the overlying oil coat may be considered objectionable in some applications due to its "oily feel" or to the residue of the oil coat which is left on the hands of one touching the coated part. In some individuals, the presence of the residue can be accompanied by skin irritation. Thus, it was desirable to formulate a protective coating similar to that disclosed in U.S. Pat. No. 4,737,385 which could be substantially volatilized during the curing step to leave only a dry-to-touch film.

U.S. Pat. No. 5,037,678 discloses such a dry-to-touch coating composition. In order to obtain a dry-to-touch product, it was necessary to volatilize the oil associated with the product. The oil associated with U.S. Pat. Nos. 4,737,385 and 4,849,264 volatilized at 300° F. However, at this temperature the paint component of the coating was destroyed by fracturing. This destruction of the paint component compromised the corrosion resistance associated with the dry-to-touch product. Therefore, an oil having a lower volatilization temperature was deemed necessary. However, when the parts were baked, the high percentage of oil loss also resulted in the parts having a tendency to stick together. Therefore, the invention disclosed in U.S. Pat. No. 5,037,678 incorporated an amine soap which formed a parting agent on the coated surface so as to prevent the sticking of the parts.

However, the coating composition disclosed in U.S. Pat. No. 5,037,678 did not have torque properties. It is this apparent that the need exists for an improved coating composition which provides effective corrosion resistance while at the same time exhibiting torque.

SUMMARY OF THE INVENTION

There is disclosed a process for manufacturing a dry-to-touch coating having corrosion resistance and torque properties, said process comprising adding PTFE to an oil, said oil containing an amine soap, thoroughly mixing PTFE into said oil, forming a homogenous dispersant of said PTFE in said oil, mixing a resin forming paint component, adding water to said mixed paint component, mixing said resin forming paint component in water with said oil, and adjusting the pH. In this process, the PTFE when added to the oil comprises in the range of 10% to 30% by weight. More preferably, the PTFE when added to the oil comprises 20% by weight. Furthermore, the homogenous dispersion is formed by mixing the PTFE and the oil for at least 10 minutes.

Using this process, the resin forming paint component comprises in the range of 40% to 70% of the coating, the water comprises in the range of 5% to 10% of the coating, and the oil and PTFE blend comprises in the range of 10% to 30% of the coating. More preferably, the oil and PTFE blend comprises 20% by weight. Furthermore, according to this process, the pH is in the range of 8.2 to 9.6, and more preferably it is in the range of 8.8 to 9.2. Still further, the process comprises the exposure of the resin, water and oil coating to a temperature of between 175° to 250° F. until the coated fastener is dry-to-touch.

There is also disclosed a process for manufacturing a dry-to-touch coating having corrosion resistance and torque properties, said process comprising adding PTFE to an oil, said oil containing an amine soap, said PTFE comprising 10% to 30% of the blend by weight, thoroughly mixing said PTFE into said oil, forming a homogeneous dispersion of said PTFE in said oil by mixing said PTFE and said oil for at least 10 minutes, mixing a resin forming paint component, adding water to said mixed paint component, mixing said resin forming paint component and water with said oil, said resin forming paint component comprising in the range of 40% to 70% of said coating, said water comprising in the range of 5% to 10% of said coating, and adjusting the pH. Preferably the oil and PTFE blend comprises 20% by weight. Further, the pH is in the range of 8.2 to 9.6 and more preferably is in the range of 8.8 to 9.2. Additionally, the process comprises the exposure of the resin, water, and oil coating to a temperature of between 175° to 250° F. until it is dry-to-touch.

Still further there is described a process for manufacturing a dry-to-touch coating having corrosion resistance and torque properties, said process comprising adding PTFE to an oil, said oil containing a amine soap, said PTFE comprising 10% to 30% of the blend by weight, thoroughly mixing the PTFE into the oil, forming a homogeneous dispersion of the PTFE in the oil by mixing the PTFE and the oil for at least 10 minutes, mixing a resin forming paint component, adding water to the mixed paint component, mixing the resin forming paint component and water with the oil, said resin forming paint component comprising in the range of 40% to 70% of the coating, said water comprising in the range of 5% to 10% of said coating, adjusting the pH until it is in the range of 8.2 to 9.6, coating a product with the resin, water, and oil mixture, and exposing the resin, water, and oil mixture to a temperature of between 175° to 250° F. until it is dry-to-touch. Preferably the oil and PTFE blend comprises 20% by weight. Additionally, the pH is most preferably in the range of 8.8 to 9.2.

One aspect of this invention provides a novel method for making a composition for improving the corrosion resistance of metal parts, while at the same time exhibiting torque properties, which method results in an underlying resin film layer and an overlying, dry-to-touch soap film layer.

Another aspect of the present invention provides the composition formed by the above method which permits application of a single coating mixture of a resin film forming paint component and a soap film forming component to form the resulting two distinct layers on the coated part in an economical manner.

Yet another aspect of the present invention provides a method for forming a composition as described which eliminates the tendency of metal parts to stick to one another during the coating and curing step, thereby eliminating the necessity for a second application of an additional protective coat in a second coating step for the purpose of covering spot losses of the coat caused by physical separation of portions of parts adhered to one another.

Other aspects and advantages of the instant invention will be apparent from the following description, examples, and appended claims.

DETAILED DESCRIPTION OF THE INVENTION

Specifically, the present invention is concerned with a novel method For forming a composition which includes a resin film forming component and a soap film forming component which is not coupled into the resin film forming component to form a stable solution or emulsion therewith. Preferred resin film formers, also referred to as resin forming paint components, useful in the present invention include those typical conventional water based paint formulations used to apply paint coats to metal parts for corrosion resistance. The soap film forming component preferably comprises a liquid organic carrier agent, an organic acid and an organic anti-ionic alkaline amine agent capable of reacting with organic acid to form an amine soap. The carrier agent functions to provide a solute in which the organic acid and alkaline amine agent may be dissolved. However, it is not coupled into solution or stable emulsion with the resin film forming composition.

The resin film forming component and soap film forming component may then be mixed together to form a homogenous, yet temporary dispersion of the two components. This characteristic is important for reasons similar to those described in U.S. Pat. No. 4,737,385 to permit a single coating of the two components to be applied in a uniform manner having each component separating during the curing step to form two separate and distinct layers on the coated part.

However, unlike the prior coating composition referenced above, the carrier agent in accordance with the present invention is volatilized during the curing step so that a dry-to-touch protective soap film is deposited over the separate resin film instead of an oily layer. The carrier agent for the soap forming component therefore must have certain characteristics in addition to being uncoupled in the resin film former. For example, it should vaporize at a rate which is compatible to a temperature range and time reasonably practical for commercial coating applications typically employed in curing the resin film forming component. Additionally, it must be soluble with the soap forming agents.

Polytetrafluoroethylene powder (PTFE) is known to improve reduction of the co-efficient of friction. U.S. Pat. No. 4,849,264 discloses their use. However, the PTFE particles associated with this invention are not melted, as typically used in the prior art. PTFE particles come in both ellipsoid and spherical shapes.

With respect to this invention, as disclosed below, ellipsoid PTFE particles were found desirable and spherical shaped particles were found to result in an unacceptable mixture. PTFE powders which result in an acceptable product include those manufactured by Ausimont Fluoropolymer Division sold under the name Polymist F5A.

Suitable carrier agents are those saturated or unsaturated straight chain hydrocarbons which are solvents for the agents which react to form a soap useful in accordance with the present invention. The carrier agent provides a solvent vehicle for the soap reactants and is incompatible with the resin film former vehicle so as not to be coupled therewith upon mixing. The carrier and soap formed may then separate from the resin film former after application of a coating of this mixture to form the two distinct film layers described herein.

The most preferred carrier agents have a vapor pressure which is reasonably compatible with the temperature and time period typically employed in the paint curing steps of conventional commercial coating applications, so that the carrier agent may be substantially volatilized to leave primarily a soap film overlying the cured resin film. Typical commercial coating applications for metal fasteners, for example, desirably employ a curing step at temperatures between 200°–250° F. for a time ranging between 5–20 minutes, and preferably about 10 minutes. A commonly used temperature is about 225° F. However, here it is more desirable to have volatilization occur during a curing at 190° to 200° for 10 to 15 minutes. This allows the paint to remain intact.

Hydrotreated naphthenic distillate mineral oils have been found to substantially vaporize within these parameters and effectively provide desirable results in accordance with the present invention. Those compatible hydrocarbons which have higher vapor pressure and lower boiling points than the preferred agents described herein may be expected to be operable as carrier agents, but may be less desirable for practical or economic reasons for some commercial applications. Those hydrocarbons which have lower vapor pressures and higher boiling points than the disclosed preferred carrier agents will require higher curing temperature and longer curing times to become substantially vaporized.

The carrier agent is at least substantially vaporized during the curing step in accordance with the present invention. However, it is believed desirable that a small residue of the carrier agent remain in solution with the soap film formed to enhance the corrosion resistance of the soap film layer, yet not in any amount which detracts from the intended non-oily or dry-to-touch characteristic of the film. Included in the preferred group of carrier agents are castor oil, tung oil, linseed oil, and other paraffinic oils having the appropriate characteristics mentioned above.

The preferred soap forming components include fatty acids and organic neutralization agents which saponify the fatty acids to form a soap. Examples of suitable fatty acids include palmitic, stearic, oleic, and linoleic. Preferred neutralization agents include a amines within the molecular weight range of about 105–191 grams per mole and mixtures thereof. These include diethanolamine, triethanolamine, mono-isopropanolamine, di-isopropanolamine, and tri-isopropanolamine and mixtures thereof. Other organic acids and neutralizing amine combinations would be expected to operably function in accordance with the present invention. Particularly with respect to fatty acids and other long chain organic acids, the higher molecular weight fatty acids would tend to form a harder soap film, while those of lower molecular weight would tend to form a softer film layer. A softer film layer is believed to be more desirable for the purposes of the present invention.

Resin film formers useful in the present invention include those water based paint compositions typically used to coat metal fasteners in the automobile industry. A preferred paint composition is one commercially available from Saran Corporation, and sold under the tradename SARAN BWP 9012. While the pigment containing paint composition is desirable for many applications, a clear paint is quite suitable for the general purposes of the present invention.

Any nonionic wetting agent or detergent which is sufficiently soluble in oil and water, and compatible with the purposes of the present invention would be expected to be operable to aid the dispersibility of the two phases in one another. A preferred dispersing aid is a blend of a metal petroleum sulphonate and glycol. Other compatible agents include nonylphenoxy ethyleneoxide ethanols, octylphenoxy ethyleneoxide ethanols, and ethyleneoxide block polymers, as long as these agents are sufficiently soluble in both oil and water. Such agents reduce surface tension to a degree so as to permit the resin film former and soap film forming components to be uniformly dispersed within one another to form a temporary dispersion as defined herein. However, they are used in amounts which fall short of forming a stable emulsion of the mixture of the resin film and soap film forming components. Satisfactory uniformity of the dispersion is important to assure that a uniform film of each component is formed on the coated part upon separation of the components during the curing step.

It has also been found that adjusting the pH of the mixture is beneficial to control the length of time the temporary dispersion remains uniform upon standing, and provides practical advantages in commercial coating applications of the mixture while still permitting the necessary separation of the two phases during the current step. Preferably for example, adjusting the pH of the mixture to between 8.2 and 9.6 enables the temporary dispersion of the two component mixtures to remain in a uniformly dispersed form during a eight-hour work shift without requiring relatively frequent mixing.

Too low a pH will result in a relatively rapid separation of the di-phase mixture and requires frequent mixing in order to maintain a uniform dispersion. High pH values of the dispersed mixture retard separation. However, too high a pH value will couple the mixture of the resin film former and soap Film former to form a single phase foreclosing separation of the two components during the curing step. This nullifies some of the advantages obtained in accordance with this invention. A preferred range of pH values of the preferred mixture described below appears to be between about 8.6 to 9.2 and more preferably 8.8 to 9.2, such that the coating mixture is able to be maintained in a uniformly dispersed state for at least eight hours.

Strong alkaline amines work well as pH adjusting agents in the context of the present invention. A preferred amine is 1-amino-2 methylpropanol. These agents may be initially added during the dilution of the concentrated mixture with water and may be periodically added to the coating bath of the mixture during commercial coating operations to counteract the effect of acid residues remaining on the phosphated parts being coated. However, such pH adjusting agents must be compatible with the constituents in both the resin film forming composition and the soap film former relative to their function and purpose in accordance with the present invention.

The combined resin film former and soap film former mixture may be prepared in concentrated form and later diluted with water. Deionized water is preferred to reduce the initial viscosity of the concentrated mixture to the desired level. One must be sure not to add too much water in order to avoid coupling of the mixture of the resin film forming component and the soap film forming component. As indicated above, if the mixture of these two components is coupled into solution or into a stable emulsion, then separation will not occur during the curing step and some of the advantageous results of the present invention will not be realized. It has been found that water up to about 30% by volume of the total mixture of both components can be utilized and still avoid coupling of the two components to one another to form a single phase rather than a di-phase temporary dispersion.

The addition of a wetting agent or detergent to the soap film forming component in order to aid the formation of a uniform dispersion of the two-phase mixture between the resin film former and the soap film former is recommended, particularly when the lighter naphthenic distillate oils or their equivalents are employed as the carrier agent. A blend of sodium petroleum sulphonate and a glycol is one of the preferred wetting or dispersion aiding agents. The preferred glycol blended with the sodium petroleum sulphonate may be one from the group including ethylene glycol, diethylene glycol, triethylene glycol, tetraethylene glycol, propylene glycol, dipropylene glycol, tripropylene glycol, 1,3 butylene glycol, hexylene glycol and mixtures thereof. The ratio of the sodium petroleum sulphonate to the glycol in a blend should be within the range of about 20:1 to 40:1. The preferred range is within about 24:1 to 34:1. A concentration of the wetting agent in the soap film forming component is preferably within the range of about 5 to 15% by weight. The preferred range is between 9% to 11% by weight. Examples of commercially available wetting agent blends which work well in accordance with the present invention include those sold by Emery Corporation under the brand name TWITCHELL BASE and by Witco Corporation under the brand name PETROMIX.

A preferred soap film forming component for use in the present invention is sold commercially by Texo Corporation under the brand name TEXO LP 1528, and includes a suitable naphthenic mineral oil carrying agent, a blend of fatty acids, a neutralizing agent, and a wetting or dispersion aiding agent in a formulation within the guidelines described herein.

A resin film forming and soap film forming composition in accordance with the present invention may be mixed to form a homogenous temporary suspension of the two components. The temporary suspension separates to form two, easily visible, separate phases upon standing in ambient conditions in less than 24 hours. Preferably the temporary dispersion will remain relatively uniform for about 8–16 hours, which time period corresponds to one or two shifts under typical commercial conditions. The pH of the mixture can be adjusted accordingly as described above to accommodate the desired conditions of the user.

The coating composition of the present invention as prepared for use includes 40% to 70% by weight of the resin film forming component, 10% to 30% by weight of the soap film forming component, and about 5% to 10% by weight of water. Water is added to dilute a concentrated mixture of the two components, and to adjust the viscosity according to the particular application. Good results in accordance with the present invention have been obtained in tests when the viscosity of the mixture is approximately 60 seconds with a number 2 Zahn cup at 75° F. The desired viscosity depends upon the thickness of the coating desired and the practical economics of commercial application. However, preferably the mixture should be of a viscosity which is relatively easy to apply and yet a single coating thereof should provide the distinct film layers of each component on the part sufficient to obtain the desired protection level.

The composition of the present invention may be applied using conventional techniques of coating articles, including dip spinning, brushing, and other well-known methods. The parts to be coated should preferably be prepared in accordance with well-known and conventional cleaning and phosphating steps employed in the industry for improving salt spray corrosion resistance. During application of the formula associated with the present invention, conventionally accepted painting practices are followed.

Parts coated with the formulation associated with the present invention during curing substantially volatilize the soap film forming component, thereby leaving a soap film uniformly distributed over the underlying cured resin film which has adhered to the surface of the part. In addition to providing another vapor barrier to inhibit corrosion in the form of a soap film, the soap film forming component further acts as a parting agent in the sense that it essentially eliminates the sticking together of the coated parts, which sticking typically occurs in conventional batch painting methods of metal parts.

Metal parts, such as fasteners, treated with the formulation obtained in accordance with the present invention show excellent corrosion resistance relative to industry standards salt spray tests, while at the same time eliminating the "oily" surface present using other methods of the prior art. Most importantly, metal parts treated in accordance with this invention exhibit excellent torque properties. Salt spray tests in accordance with the ASTM Method B117 indicate that parts coated in accordance with the invention have passed 480 hours of exposure to a salt spray atmosphere. This is twice as great as the minimum standard exposure of 240 hours set in connection with major automobile manufacturers.

The invention will be better understood in view of the following examples, which are illustrative only and should not be construed as limiting the invention.

Experimental—Determination of Process

EXAMPLE 1

A soap film forming component was combined with a resin film forming component in proportions taught in the prior art in U.S. Pat. No. 5,037,678. To this composition was added PTFE in an amount as taught in the prior art in U.S. Pat. No. 4,849,264. The PTFE was comprised of particles having a spherical shape, and was blended into the liquid components using a paddle mixer. Following mixing for a time found to be acceptable based on U.S. Pat. No. 4,849,264, the mixture was not homogeneously mixed. Surprisingly, the composition did not work as to the providing of torque.

EXAMPLE 2

Based on the results obtained in Example 1, it was conjectured that the shape of the PTFE particles was largely responsible for the non-homogeneity. Consequently the shape of the PTFE particles used in connection with the process associated with this invention was changed to ellipsoidal from spherical. Once again, following mixing with a paddle mixer, the mixture was not homogenous and torque was unable to be achieved.

EXAMPLE 3

Since PTFE is sometimes used as a filler in paints, it was decided to incorporate the PTFE of Example 2 into the resin film forming component of the invention, and then mix the PTFE containing resin film forming component with the oil phase. Following mixing with a paddle mixer, the mixture still was not homogenous and torque was unable to be achieved.

EXAMPLE 4

Since PTFE is sometimes used as a filler in paints, it was decided to incorporate the PTFE of Example 2 into the resin film forming component of the invention, and then mix the PTFE containing resin film forming component with the oil phase. Based on the results so far achieved, it was conjectured that mixing using a paddle mixer was contributing to the non-homogeneity. Consequently, in this experiment the PTFE was sheared into the resin film former component. Following mixing, the mixture still was not homogenous and torque was unable to be achieved.

EXAMPLE 5

Since PTFE is sometimes used as a filler in paints, it was decided to incorporate the PTFE of Example 2 into the resin film forming component of the invention, and then mix the PTFE containing resin film forming component with the oil phase. Based on the results so far achieved, it was conjectured that the PTFE needed time following mixing to be adequately wetted. Consequently, in this experiment, following shearing, the PTFE was allowed to remain in contact with the resin film forming component for at least ten minutes prior to being mixed with the soap film forming component. A Cowel disperser was used to permit the PTFE to be wetted out. At the conclusion of following this process, the mixture still was not homogenous and torque was unable to be achieved.

EXAMPLE 6

In a departure from the prior art teaching of how to treat PTFE discussed above, the PTFE of Example 2 was added to the soap film forming component. The process of Example 5 was then employed. The resin film forming component associated with the invention was mixed with the water component. The resin film forming component and water mixture was then mixed with the soap film former component. Homogeneity was unexpectedly achieved.

In the preferred embodiment of the invention, composition of the PTFE/soap film forming component mixture is 20% PTFE and 80% soap film forming component by weight, resulting in a viscous, paste-like material. The shearing can occur in a range of 300 to 1000 rpm. The time for wetting is at least ten minutes or until homogeneity occurs between the PTFE and the soap film forming component.

In the preferred embodiment of the invention, the resin film forming component and the water are mixed for two minutes at room temperature. The above mixture is then mixed with the soap film forming component for five minutes at room temperature. Additionally, the pH is adjusted to between 8.2 and 9.6 and most preferably to between 8.8 and 9.2 using Aqua pH+, a 17% mixture of 95% AMP by weight in water.

The results from the above experiments demonstrate that the product produced by the process associated with the present invention is effective for providing corrosion resistance as well as torque. While the method or process herein described constitutes a preferred embodiment of the invention, it is to be understood that the invention is not limited to this precise method or process and that changes may be made therein without departing from the scope of the invention which is defined in the appended claims.

What is claimed is:

1. A process for manufacturing a dry to touch coating composition having corrosion resistance and torque, said process comprising:
    adding polytetrafluoroethylene to an oil, said oil containing an amine soap, said polytetrafuoroethylene when added to said oil comprising in the range of 10%–30% by weight,
    thoroughly mixing said polytetrafluoroethylene into said oil,
    forming a homogenous dispersion of said polytetrafluoroethylene in said oil,
    mixing a resin forming paint component,
    adding water to said mixed paint component,
    mixing said resin forming paint component and water with said oil,
    adjusting the pH until it is in the range of 8.2–9.8, and
    exposing said resin, water, and oil mixture to a temperature of between 175° to 250° F. until it is dry to touch.

2. The process of claim 1 wherein said polytetrafluoroethylene when added to said oil comprises 20% by weight.

3. The process of claim 1 wherein said homogenous dispersion is formed by mixing said polytetrafluoroethylene and said oil for at least 10 minutes.

4. The process of claim 1 wherein said resin forming paint component comprises in the range of 40%–70% of said coating, and said water comprises in the range of 5%–10% of said coating.

5. The process of claim 1 wherein said oil and polytetrafluoroethylene blend comprises 20% by weight.

6. The process according to claim 1 wherein said pH is in the range of 8.8–9.2.

7. A process for manufacturing a dry to touch coating composition having corrosion resistance and torque, said process comprising:
    adding polytetrafluoroethylene to an oil, said oil containing an amine soap, said polytetrafluoroethylene comprising 10%–30% of the blend by weight,
    thoroughly mixing said polytetrafluoroethylene into said oil,
    forming a homogenous dispersion of said polytetrafluoroethylene in said oil by mixing said polytetrafluoroethylene and said oil for at least 10 minutes,
    mixing a resin forming paint component,
    adding water to said mixed paint component,
    mixing said resin forming paint component and water with said oil, said resin forming paint component comprising in the range of 40%–70% of said coating, said water comprising in the range of 5%–10% of said coating, and
    adjusting the pH until it is in the range of 8.2–9.6, and
    exposing said resins water, and oil mixture to a temperature of between 175° to 250° F. until it is dry to touch.

8. The process of claim 7 wherein said oil and polytetrafluoroethylene blend comprises 20% by weight.

9. The process according to claim 7 wherein said pH is in the range of 8.8–9.2.

10. A process for manufacturing a dry to touch coating composition having corrosion resistance and torque, said process comprising:
    adding polytetrafluoroethylene to an oil, said oil containing an amine soap, said polytetrafluoroethylene comprising 10%–30% of the blend by weight,
    thoroughly mixing said polytetrafluoroethylene into said oil,
    forming a homogenous dispersion of said polytetrafluoroethylene in said oil by mixing said polytetrafluoroethylene and said oil for at least 10 minutes,
    mixing a resin forming paint component,
    adding water to said mixed paint component,
    mixing said resin forming paint component and water with said oil, said resin forming paint component comprising in the range of 40%–70% of said coating, said water comprising in the range of 5%–10% of said coating, adjusting the pH until it is in the range of 8.2- to 9.6, coating a substrate with said resin, water, and oil mixture, and exposing said resin, water, and oil mixture to a temperature of between 175° to 250° F. until it is dry to touch.

11. The process of claim 10 wherein said oil and polytetrafluoroethylene blend comprises 20% by weight.

12. The process according to claim 10 wherein said pH is in the range of 8.8–9.2.

* * * * *